United States Patent
Copps

(10) Patent No.: US 7,756,132 B2
(45) Date of Patent: Jul. 13, 2010

(54) RAPID MESSAGING PROTOCOL WIRELESS NETWORK DATA COMMUNICATION SYSTEM

(75) Inventor: Lyman Alden Copps, Raleigh, NC (US)

(73) Assignee: Digital Recorders, Inc., Dallas, TX (US)

( * ) Notice: Subject to any disclaimer, the term of this patent is extended or adjusted under 35 U.S.C. 154(b) by 691 days.

(21) Appl. No.: 11/610,417

(22) Filed: Dec. 13, 2006

(65) Prior Publication Data

US 2007/0133566 A1    Jun. 14, 2007

Related U.S. Application Data

(60) Provisional application No. 60/749,740, filed on Dec. 13, 2005.

(51) Int. Cl.
*G06F 7/00* (2006.01)

(52) U.S. Cl. .................................. 370/392; 370/474

(58) Field of Classification Search ................ 371/32, 371/33; 370/389, 392, 400, 401, 474, 476; 709/245, 246; 714/52, 746, 752, 758, 774
See application file for complete search history.

(56) References Cited

U.S. PATENT DOCUMENTS

| | | | | |
|---|---|---|---|---|
| 4,862,461 A | * | 8/1989 | Blaner | 714/749 |
| 5,260,933 A | * | 11/1993 | Rouse | 370/216 |
| 5,394,391 A | * | 2/1995 | Chen et al. | 370/441 |
| 6,037,932 A | * | 3/2000 | Feinleib | 348/478 |
| 6,236,647 B1 | * | 5/2001 | Amalfitano | 370/335 |
| 6,791,982 B2 | * | 9/2004 | Westberg | 370/392 |
| 6,975,595 B2 | * | 12/2005 | Peterson | 370/252 |
| 7,295,575 B2 | * | 11/2007 | Ido et al. | 370/474 |
| 7,400,613 B2 | * | 7/2008 | Sala et al. | 370/341 |
| 7,573,821 B2 | * | 8/2009 | Chilukoor et al. | 370/235 |
| 7,586,948 B2 | * | 9/2009 | Hiddink et al. | 370/473 |
| 2002/0080789 A1 | | 6/2002 | Henderson et al. | |
| 2003/0026267 A1 | * | 2/2003 | Oberman et al. | 370/397 |
| 2003/0223458 A1 | | 12/2003 | Matthews et al. | |
| 2004/0141525 A1 | | 7/2004 | Bhushan et al. | |
| 2005/0063320 A1 | | 3/2005 | Klotz et al. | |
| 2006/0083229 A1 | * | 4/2006 | Jordan et al. | 370/389 |

* cited by examiner

*Primary Examiner*—Pankaj Kumar
*Assistant Examiner*—Duc T Duong
(74) *Attorney, Agent, or Firm*—Howison & Arnott, L.L.P.

(57) ABSTRACT

An apparatus and method for transmitting data over a wireless connection uses a transmitter and receiver. The receiver assembles received data packets according to an identified predefined template and sequence numbers assigned at the transmitter. The transmitter also maintains an optimum packet load of the wireless connection at a selected level responsive to a packet count maintained at the transmitter.

29 Claims, 13 Drawing Sheets

| + | BITS 0-15 | 16-31 |
|---|---|---|
| 0 | SOURCE PORT 520 | DESTINATION PORT 522 |
| 32 | LENGTH 524 | CHECKSUM 528 |
| 64 | DATA | |
*FIG. 5b*
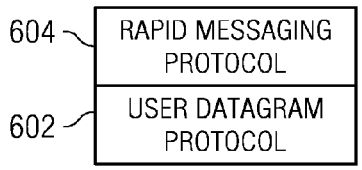
*FIG. 6*
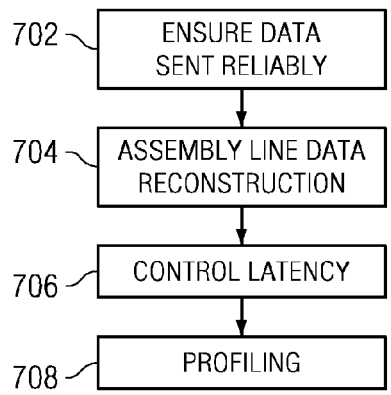
*FIG. 7*
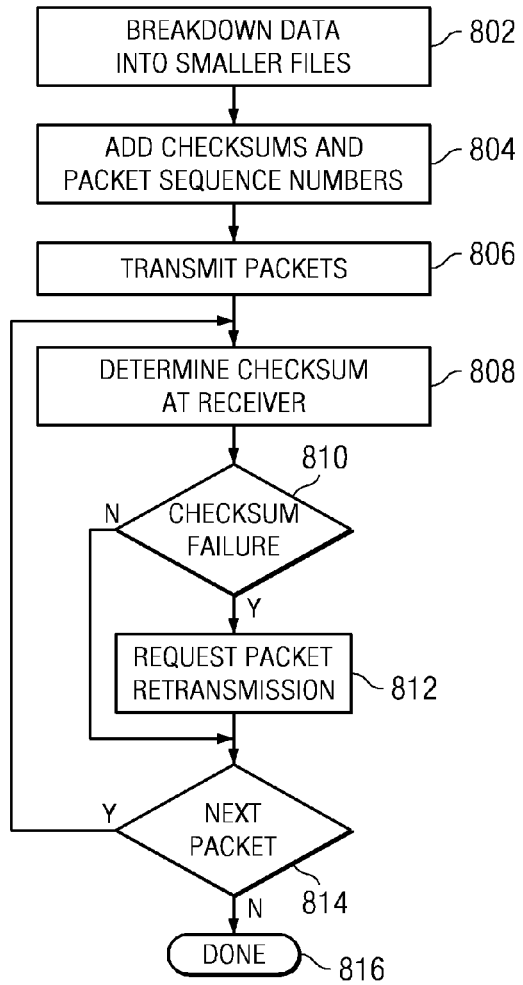
*FIG. 8*

RAPID MESSAGING PROTOCOL WIRELESS NETWORK DATA COMMUNICATION SYSTEM

CROSS-REFERENCE TO RELATED APPLICATIONS

This application claims priority from U.S. Provisional Application No. 60/749,740 filed on Dec. 13, 2005, which is incorporated herein by reference.

TECHNICAL FIELD OF THE INVENTION

The present invention relates to wireless transmission of data between a transmitting end and a receiving end, and more particularly, to a system and method for rapidly and accurately transmitting wireless data between a transmitting end and a receiving end.

BACKGROUND OF THE INVENTION

Mobile wireless communications pose difficult performance challenges for wireless manufacturers trying to accommodate wireless users. There are many variables in existing wireless networks that work against traditional methods employed by the wireline world of networking. Many systems have tried to employ methods of transmission control protocol/internet protocol (TCP/IP) in an unreliable wireless environment for data and video and have experienced numerous reliability issues. TCP is the internet connection oriented transport protocol which is typically reliable for a predictable network. Circuit switched wireline networks set up and detach connections for callers, initially designed for voice. The connections handle data in this circuit switched environment in a predictable manner on the physical layer.

Wireline networks do not handle bursts of data effectively. TCP was designed and optimized around reliable wireless connections, where bit and packet error rates are much lower than those achievable by wireless networks. When TCP encounters errors such as dropped or lost packets, it assumes that there is a congestion on the link rather than assuming the link is unreliable. TCP handles this condition by reducing the information transmission rate that the sender is allowed to use. By interpreting the unavoidable errors in the wireless communications network as congestion, the effective data rate at the start of the TCP session is extremely low. The effective data rate gradually builds over time as the system determines the peak transmission rate.

Conventional voice telephone networks, including 2.5G, 3G wireless as well as general packet radio service/enhanced data rates for GSM evolution/evolution data optimized/high speed data packet accelerator (GPRS/EDGE/EV-DO/HS-DPA) have mostly been designed for circuit switched voice communications. Other systems, such as the internet are more effective for handling data traffic. Within packet switched systems, data traffic requires control layers such as the LINK layer and the MAC layer. These conventional voice telephone networks present a number of challenges for transmitting data. The networks can be unreliable since links for establishing data transmissions or voice calls may be unexpectedly dropped or broken. The reliability of the connections are directly impacted by local call traffic levels which can alter the speed and reliability of the local wireless network. Network transmissions over wireless networks tend to be intermittent in nature rather than consistent. Additionally, within wireless networks several packets may be lost without warning. When transmitting data such as video this can cause substantial problems. Also, due to the manner in which TCP/IP operates, the transmission rates may vary substantially on the network. Further, cellular wireless networks can store a large number of packets in transit which may hamper the interaction response between transmitting and receiving units. Thus, there is needed a more reliable protocol system and method for transmitting data over wireless communications network.

SUMMARY OF THE INVENTION

The present invention disclosed and claimed herein, in one aspect thereof, comprises an apparatus and method for transmitting data over a wireless connection. A transmitter and receiver are configured to ensure reliable transmission of a plurality of data. The receiver is configured to assemble received data packets according to an identified predefined template and sequence numbers assigned at the transmitter. The transmitter maintains the packet load of the wireless connection at a selected level responsive to a packet count maintained at the transmitter.

BRIEF DESCRIPTION OF THE DRAWINGS

For a more complete understanding of the present invention and the advantages thereof, reference is now made to the following description taken in conjunction with the accompanying Drawings in which:

FIG. 5b illustrates a UDP header;

FIG. 6 illustrates the manner in which the rapid messaging protocol is utilized with the UDP protocol to achieve wireless data transmissions;

FIG. 7 is a flow diagram illustrating the overall manner in which the rapid messaging protocol enables improved wireless data transmissions;

FIG. 8 is a flow diagram illustrating the manner in which the packet reliability may be maintained within a wireless data transmission network;

DETAILED DESCRIPTION OF THE INVENTION

Figure 1:
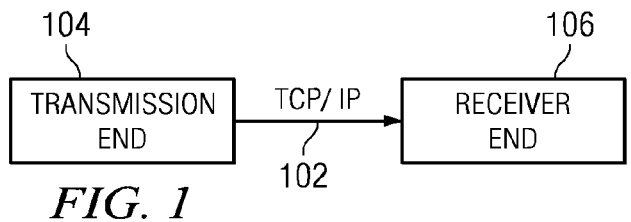
FIG. 1 illustrates the use of TCP/IP protocol for wireline transmissions between a transmission end and a receiving end.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Figure 2:
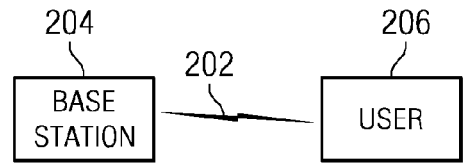
FIG. 2 illustrates a wireless transmission between a base station and a receiver.

Referring now to the drawings, there is more particularly illustrated the present systems use of the user datagram protocol (UDP) rather than TCP for the transmission of data over a wireless network. As illustrated in FIG. 1, TCP/IP communications are provided over a wireline network 102 between a transmission end 104 and receiver end 106. When the TCP/IP protocol is used over a wireless network 202, as illustrated in FIG. 2, for transmissions between a base station 204 and a receiver 206 additional challenges arise. These challenges include things such as the arrival of packet out of their transmission order. Since the packets are transmitted via a wireless network each of the packets traveling from the base station unit 204 to a receiver 206 will not necessarily take the same pathway. This can cause the packets to arrive out of order which may create problems in certain user data applications such as video. Furthermore, the through put timings available over a wireless network can vary substantially from connection to connection. The network landscape can also vary constantly with each use, and as the user receiver moves from one location to another. Cell switching may also cause packets to arrive out of sequence or be lost all together over a network.

Figure 3:
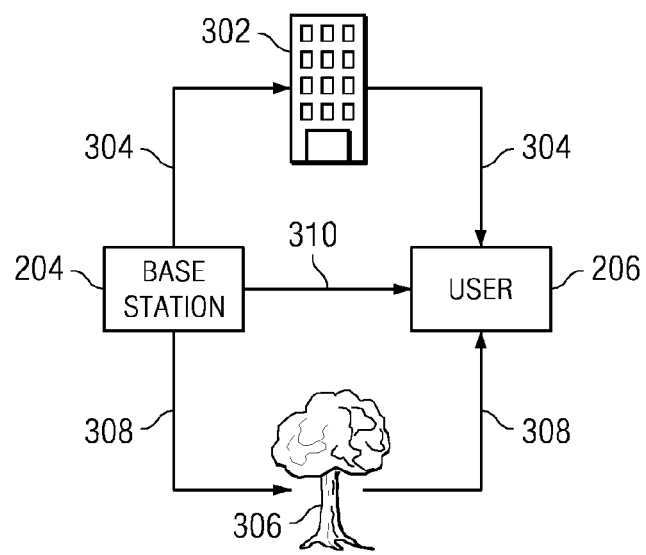
FIG. 3 illustrates multipath reflection between a transmission site and a reception site.

Thus, wireless systems operate under harsh and challenging conditions. The wireless channel is much more unpredictable than the wireline channel because of factors such as multipath reflection, time dispersion, fading, Doppler spread, Nagle algorithm delays, and sequencing inconsistencies exasperated by cell tower handoffs. Referring now to FIG. 3, there are illustrated the potential adverse affects within a wireless network caused by multipath reflection. In this case, the base station transmitter 204 is transmitting signals to the receiver 206. Multipath reflection occurs as transmitted signals are reflected by objects in the environment located between the base station and receiver. As illustrated in FIG. 3, a building 302 can cause a reflection of the signal transmitted from the base station 204 along pathway 304. Likewise, a signal transmitted from base station 204 may be reflected by a tree 306 along a pathway 308. Additionally, unreflected signals can be transmitted directly between the base station 204 and user receiver 206 along pathway 310. The objects that reflect signals may in addition to comprising the illustrated tree and building comprise hills, cars, trucks or other structures. The reflected signals arrive at the receiver 206 at random offsets since each reflection typically follows a different pathway to reach the receiver 206. The result is random signal fades as these reflections superimpose on one another. The superimposed reflections effectively cancel part of the signal energy for brief periods of time causing cancellation or fading.

Another issue which may arise within wireless networks is time dispersion or delay spreading resulting from multipath reception caused by reflections and scattering off of objects in the propagation environment such as those illustrated by the multipath reflections in FIG. 3. Signal strength, although appearing strong, may demonstrate bit error rate performance problems leading to fading.

Figure 4A:
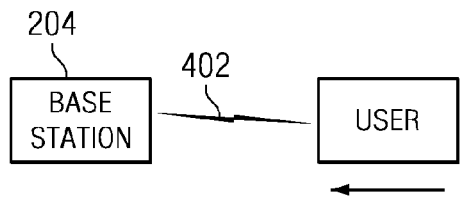
FIGS. 4a and 4b illustrate Doppler spread between a transmitting unit and a receiving unit.
Figure 4B:
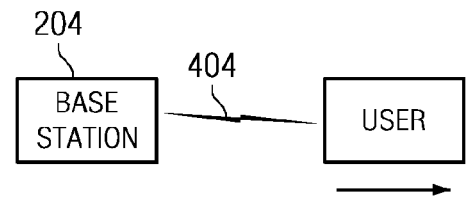

Referring now to FIGS. 4a and 4b, there are illustrated the potential affects of Doppler shift within a wireless communication system. Doppler shift is a change of frequency of an arriving wireless signal as a result of the receiver moving in a direction with respect to the arriving wireless wave. For example, as illustrated in FIG. 4a when a mobile receiver is moving toward the base station source, the frequency of the received signal 402 is increasing. Likewise, as illustrated in FIG. 4b, when the mobile receiver is moving away from the base station 204 the wireless signal 404 frequency is decreasing. These affects determine the rate at which signal fading occurs. Rapid signal fades are characteristics of the wireless operating environment.

Figure 5A:
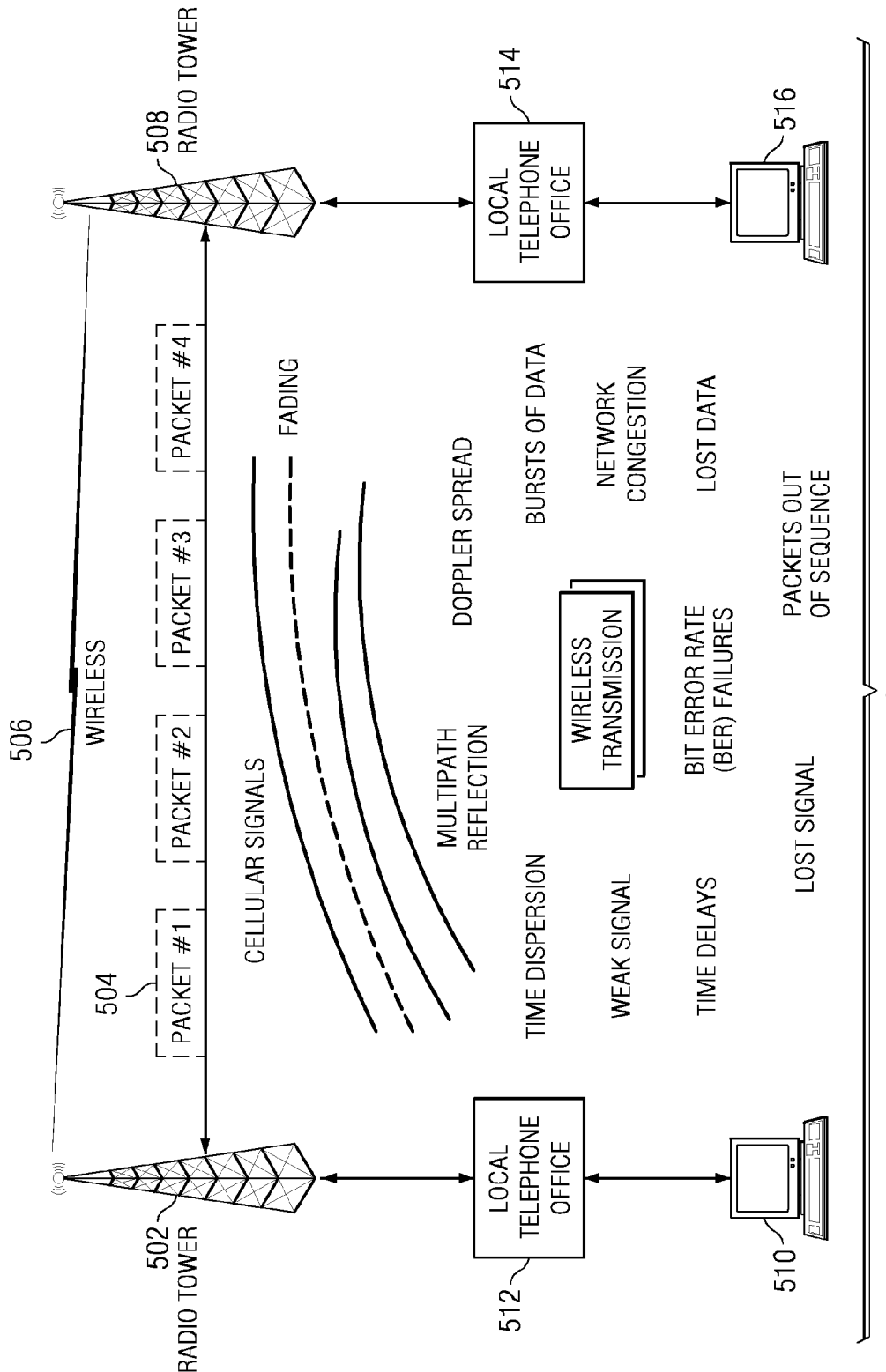
FIG. 5a illustrates the use of UDP for wireless transmissions.

Referring now to FIG. 5a, there is provided an illustration of the operation of the UDP protocol used by the present system to overcome the problems discussed above. UDP is an internet protocol that provides connectionless datagram delivery service to applications. UDP over IP provides the ability to address multiple end points within a single network node IP. UDP is a packet switch design for data and is optimized along the physical, MAC, LINK and network layers. As illustrated in FIG. 5a, a transmission tower 502 transmits various packets 504 as connectionless datagrams over the wireless link 506 between the first radio tower 502 and the second radio tower 508. The data packets 504 for transmission over the wireless link 506 are generated at some computing device 510 and transmitted to the radio tower 502 through a local telephone office 512. Likewise, the received data packets are provided back to a receiving computing device 516 through its local telephone office 514. UDP is a minimal message oriented transport protocol.

UDP provides a simple interface between a network layer below and a session layer or application layer above. UDP provides no guarantees to the upper layer protocol for message delivery and UDP sender retains no state on UDP messages once sent. UDP adds only application multiplexing and check summing of the header and pay lode. If any kind of reliability for the information transmitted is needed, this must be implemented in upper layers as will be described more fully in a moment with respect to the rapid messaging protocol used with UDP in the present application.

The UDP header as illustrated in FIG. 5b consists of four fields of which two are optional. The source port 520 is an optional field that identifies the sending port when meaningful and should be assumed to be the port to reply to if needed. When the field is not utilized it is set to zero. The destination port 522 identifies the destination port and is, of course, a required field such that the data may be transmitted to a selected location. The length field 524 comprises a 16 bit field that specifies the length in bytes of the entire datagram, header and data. The minimum length is 8 bytes since that is the length of the header. The field size 526 sets a theoretical limit of 65,527 bytes for the data carried by a single UDP datagram. The check sum field 528 is a 16 bit field used for error checking of the header and data. The remaining bits from 64 onward comprise the data to be transmitted.

Thus, UDP comprises a multitude of packets that are transmitted over the wireless network each packet being independent and taking its own course to the final destination. Since each packet takes a slightly or vastly different path to the final destination each packet may arrive at different times. Due to this mix up of data at the final destination, traditional file transfer is difficult to reconstruct especially for applications such as video. Thus, another layer of software is needed to ride on top of the UDP layer to perform this reconstruction.

Referring now to FIG. 6, there is illustrated how the rapid messaging protocol (RMP) layer 604 is utilized on top of the UDP layer 602 in order to provide the ability to control the datagrams flowing through the wireless network system as described hereinabove. The rapid messaging protocol (RMP) enables the accomplishment of a number of tasks in the transmission of data wirelessly between a transmitting and receiving points. The protocol enables the calculation and regulation of network throughput using actionable metrics and network analysis algorithms. RMP enables the exchange of signals for both protocol and application layers. RMP sends and receives messages in a manner required by the individual messaging types and has the ability to notify the application layer of important information.

The RMP protocol is unique in that it constantly analyzes the network and tunes itself to maximum throughput and accuracy. Other IP protocols are not cognizant of the network in which they operate, whereas RMP enables the protocol to be cognizant of the network's operation. The RMP protocol self-examines its performance through network analysis at the lower level and through statistics and metrics at a higher level. Counter measures may be taken to overcome network shortcomings. Unlike TCP, RMP is a message oriented protocol rather than connection oriented protocol since connections may be lost in the wireless environment. Adjustable settings allow the aggressiveness of the system to be programmed into the protocol's network system controls.

Utilizing a normalization algorithm, the RMP protocol attempts to find the network "sweet spot" through unstable conditions determine the maximal operating conditions. The RMP protocol provides a lower overhead than most other IP based protocols and utilizes assembly line construction methodology to flatten data construction reducing dependency on timings and packet ordering from an unpredictable network. Message type profiles for diverse data types enable easier packet reconstruction. A network watchdog monitors the health state of the link. To further reduce dependency on error prone timings, error recovery as well as other out of band activities are initiated by the receiver.

In short, the UDP network has protocol network management per communication network standards in the wireless communication world. Rapid messaging protocol is another protocol layer riding on top of the UDP layer which is distinct and independent from the UDP layer. RMP is an upper layer of the OSI model (along the lines of transport), separate from the MAC physical layer data link and traditional network layer communication.

Referring now to FIG. 7, there is illustrated a summary of the operation of the functions performed by the rapid messaging protocol which enables it to reliably and efficiently transmit large amounts of data over an unpredictable wireless network in conjunction with the UDP protocol. Initially, at step 702 actions are taken to ensure the reliability of the data being sent over the wireless communications link. The next step at step 704 involves the assembly line reconstruction of the data packets transmitted over the wireless communications network. This process enables the data to be more quickly and reliably reconstructed at the receiver than is possible using existing methods. The next step at 706, involves controlling the packet load over the wireless network. These processes involve tracking and knowing the number of packets within the network, the time they are on the network and enabling for packet retransmission as necessary. A final process at step 708 involves profiling the network to enable an analysis of the network's operation and allow tweaking and improvement of network characteristics to optimize data throughput.

The first goal of the rapid messaging protocol is to ensure that the data is received reliably. This process is accomplished using the packet checksums available via the UDP portion of the protocols. Referring now to FIG. 8, there is illustrated the process for ensuring that the data is received reliably according to the rapid messaging protocol. The data is broken down into a number of smaller files at step 802 at the transmitting end. Large amounts of data, especially video or picture data, may be broken down into more manageable file sizes typically of a 1000 bytes. The rapid messaging protocol can adjust to ranges from one byte to the allowable packet size of the network typically 1500 bytes. Packets larger than 1500 bytes are typically difficult to manage in today's wireless networks. Next, the checksum values and packet sequence numbers are added to the broken down packets at step 804. The packets are transmitted over the wireless network to the receiver at step 806. The checksum values of the received packets are determined at step 808 at the receiver. Inquiry step 810 finds lost packets and determines if the checksum values are valid and if not, requests retransmission of the packet from the transmission end at step 812.

If inquiry step 810 determines that the checksum value is valid, control passes to inquiry step 814 to determine if there exists a next received packet. If so, control returns to step 808 and the checksum value for this received packet is determined. When no further packets are received as determined at inquiry step 814, the process is completed at step 816. If packet retransmission is requested at step 812, the rapid messaging protocol only requests retransmission of the identified packet missing, or having a checksum error. The retransmission of the entire file or picture in which the checksum error occurs is not required. The rapid messaging protocol is able to request the retransmission of packets as needed due to network regulation. This leads to a more complex area of data assembly than is currently available within other program protocols.

Figure 9:
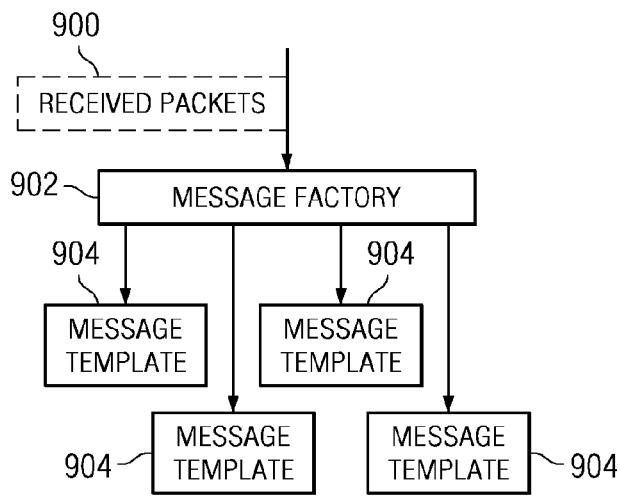
FIG. 9 illustrates the manner in which a message factory may be used to assemble various data packets into messages according to a message template at a receiving end of a wireless network.

Referring now to FIG. 9, there is illustrated the assembly line data reconstruction process utilized by the rapid messaging protocol. As described previously, Cellular packets often experience significant delays and arrive out of sequence. These physical anomalies can render many protocol timings useless or very problematic. Furthermore, packets arriving out of sequence can further complicate data reception.

In order to counter this type of undesired performance, the rapid messaging protocol manages the number of packets in the network through its built-in network management, and reduces timing dependency of packets with an assembly line approach. As illustrated in FIG. 9, a streaming protocol of received packets 900 are provided to a message factory 902 that uses an assembly line architecture of data construction to eliminate the necessity of critical timings. Received packets 900 provided to the message factory 902 are placed within the appropriate message template 904 depending upon the type of data transmission being carried out. The assembly line operation of data reconstruction is a method of eliminating protocol dependency on serialization and timing through the use of the message factory 902 within the rapid messaging protocol. The message factory 902 contains several message templates 904 which allow packets 900 from several messages arriving in any order to be populated within the templates 904. The selected template 904 is based upon the message type. The finished templates 904 are passed on and removed from the factory 902 upon completion of the template or a request to cancel the template.

If inquiry step 810 determines that the checksum value is valid, control passes to inquiry step 814 to determine if there exists a next received packet. If so, control returns to step 808 and the checksum value for this received packet is determined. When no further packets are received as determined at inquiry step 814, the process is completed at step 816. If packet retransmission is requested at step 812, the rapid messaging protocol only requests retransmission of the identified packet having a checksum error. The retransmission of the entire file or picture in which the checksum error occurs is not required. The rapid messaging protocol is able to request the retransmission of packets as needed due to network regulation. This leads to a more complex area of data assembly than is currently available within other program protocols.

Referring now to FIG. 9, there is illustrated the assembly line data reconstruction process utilized by the rapid messaging protocol. As described previously, data errors are handled by incorporating a transmission of packets that have checksum errors. Significant time would be wasted by waiting for the resending of the packet in error. This would result in overall poor performance of the protocol since time is essential in many data transmission schemes especially for pictures or video. If the receiver side is waiting for a single packet out of a number of packets to complete a data transmission, the retransmission request would have to travel back and forth across the network to complete the process. If the network is congested, this may actually have a net affect of continuing to bog down the network whereby significant poor data transmission performance is experienced.

In order to counter this type of undesired performance, the rapid messaging protocol manages packets with an assembly line approach. As illustrated in FIG. 9, a streaming protocol of received packets 900 are provided to a message factory 902 that uses an assembly line architecture of data construction to eliminate the necessity of critical timings. Received packets 900 provided to the message factory 902 are placed within the appropriate message template 904 depending upon the type of data transmission being carried out. The assembly line operation of data reconstruction is a method of eliminating protocol dependency on serialization and timing through the use of the message factory 902 within the rapid messaging protocol. The message factory 902 contains several message templates 904 which allow packets 900 from several messages arriving in any order to be populated within the templates 904. The selected template 904 is based upon the message type. The finished templates 904 are passed on and removed from the factory 902 upon completion of the template or a request to cancel the template.

Figure 10:
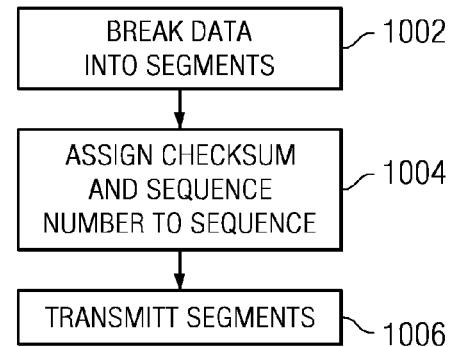
FIG. 10 is a flow diagram illustrating the manner in which the number of packets inserted into a wireless link may be tracked.
Figure 11:
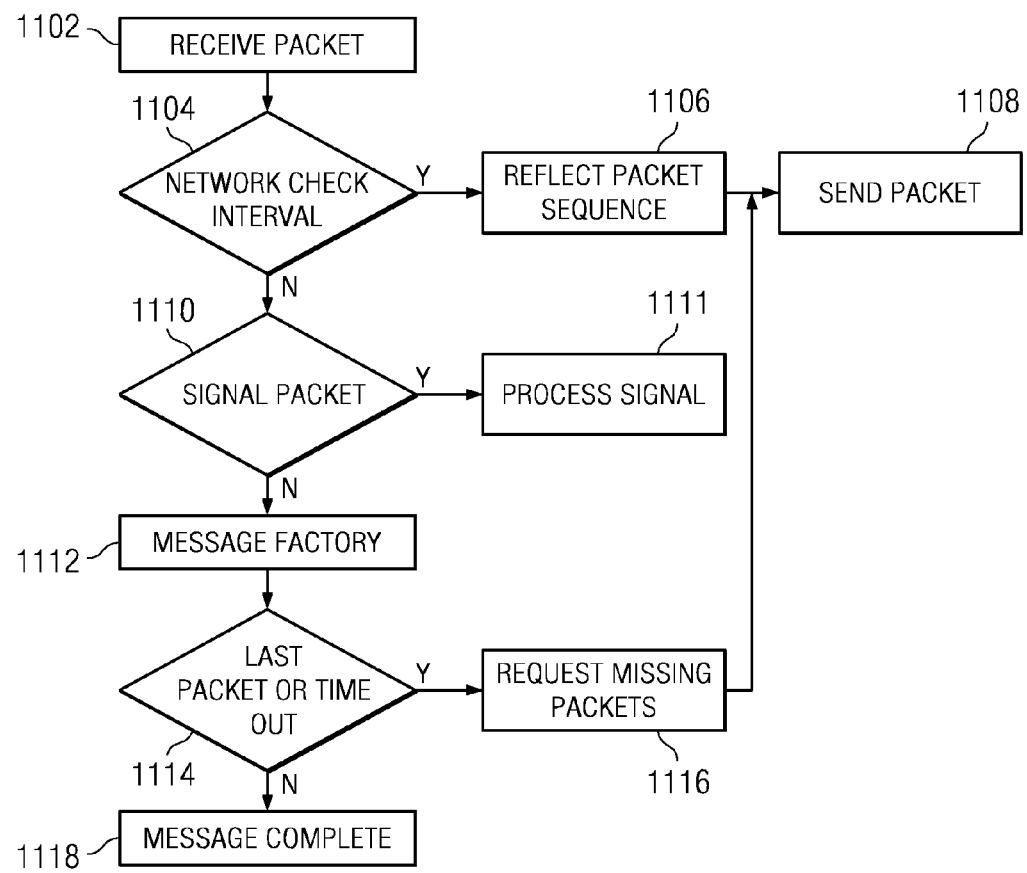
FIG. 11 is a flow diagram illustrating the manner in which the number of receive packets in the system are controlled by the receiving side of a wireless link.

The assembly line process is more fully described with respect to FIGS. 10-12. FIG. 10 illustrates the process with respect to the transmission end of the rapid messaging protocol. Initially, at step 1002 the data is broken into a number of segments. The data segments are each assigned at step 1004 a checksum value (as described previously) and a sequence number to indicate its sequence within a group of data with which the packet is associated. Finally, at step 1006, the data packet segments are transmitted to the receiver.

Referring now to FIG. 11, there is a flow diagram illustrating the manner in which the number of received packets in the system are controlled by the receiving side of a wireless link. Packets are received at step 1102. Inquiry step 1104 determines if the proper network check interval is present and if so, a reflect packet sequence process occurs at step 1106, and a packet is sent at step 1108. If inquiry step 1104 determines no, inquiry step 1110 determines if the packet is a signal packet. If so, inquiry step 1111 processes the received signal packet. If not, the packet is sent to the message factory 1112. Inquiry step 1114 determines if the received packet is the last packet or a time-out has occurred. If so, missing packets are requested at step 1116 and the request is transmitted as a packet at step 1108. If inquiry step 1114 determines that the packet is not a last packet or a time out has not occurred, a message complete determination is made at step 1118.

Figure 12A:
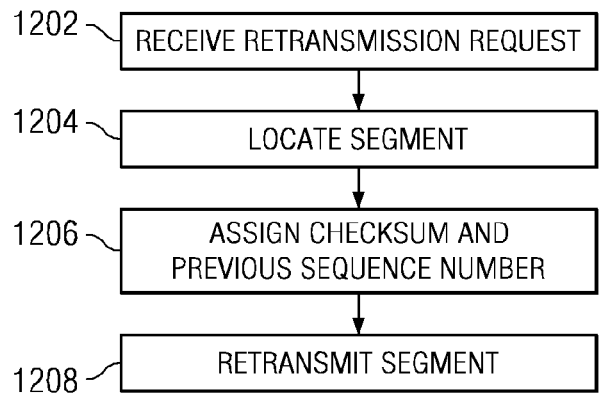
FIG. 12a is a flow diagram illustrating the transmission of packets from a transmission end responsive to a request from the receiving end.
Figure 12B:
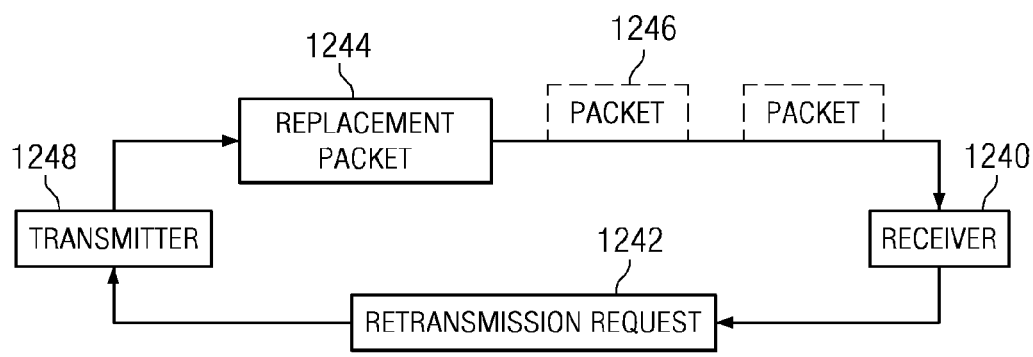
FIG. 12b illustrates parked load and retransmission requests between the transmitter and the receiver.

Referring now to FIG. 12a, there is illustrated the retransmission of a segment at the transmission end responsive to a retransmission request. The retransmission request is received at step 1202 at the transmission end, and the segment to be retransmitted is located at step 1204. Once the segment has been located, the segment is again assigned at step 1206 a checksum and the previous sequence number assigned to the segment. The located segment is retransmitted at step 1208 to the receiver. This process is more fully illustrated in FIG. 12b. Efficiency of the network decreases as it becomes saturated. As packets pile up in the network, the packet delivery time increases between transmitting and receiving end. When a UDP packet checksum fails, the network stack will trash the packet. The receiving end 1240 requests a retransmission of the missing packets via a retransmission request 1242. If the network is saturated with packets, the retransmitted packets 1244 must wait in a long line of other packets 1246 from the transmitter 1248 further delaying completion of the data on the receiving end 1240. RMP guarantees faster retransmission process since the network packet load is kept low.

Referring now to FIG. 12, there is illustrated the retransmission of a segment at the transmission end responsive to a retransmission request. The retransmission request is typically received at step 1202 at the transmission end, and the segment to be retransmitted is located at step 1204. Once the segment has been located, the segment is again assigned at step 1206 a checksum and the previous sequence number assigned to the segment. The located segment is retransmitted at step 1208 to the receiver.

Figure 13:
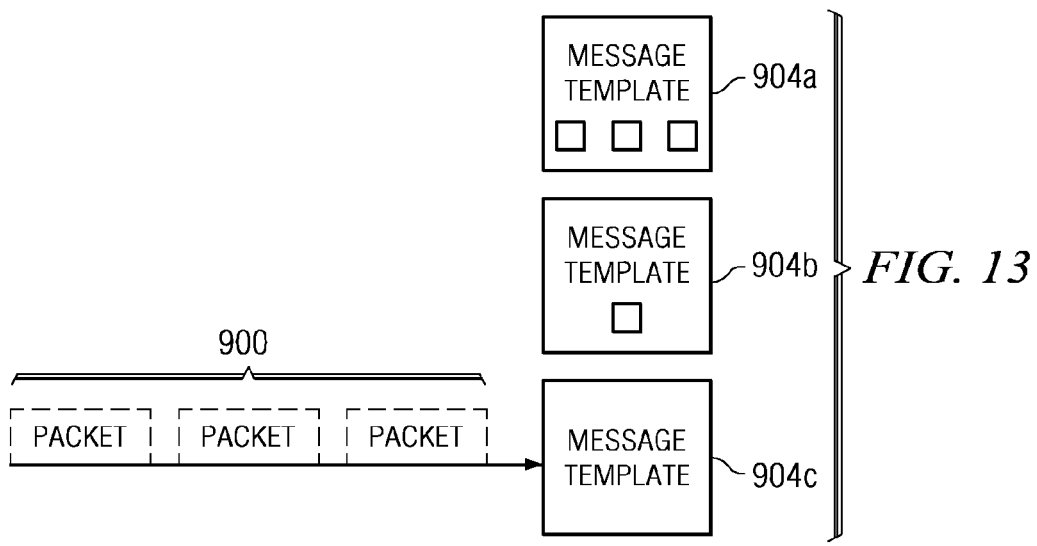
FIG. 13 illustrates the manner in which packets are assembled within message templates within the message factory.

The assembly process is more fully illustrated in FIG. 13 where it illustrates how each of the packets 900 that are received at the message factory 902, and how the individual packets are located within a particular message template 904 as they are received. The packet 900 being received is placed within message template 904c. As can be seen in FIG. 13, message template 904a presently includes three packets of its necessary group of packets while message template 904b includes only a single packet 900. This process is essentially completing data frames as the packets associated with a frame are received.

Figure 14:
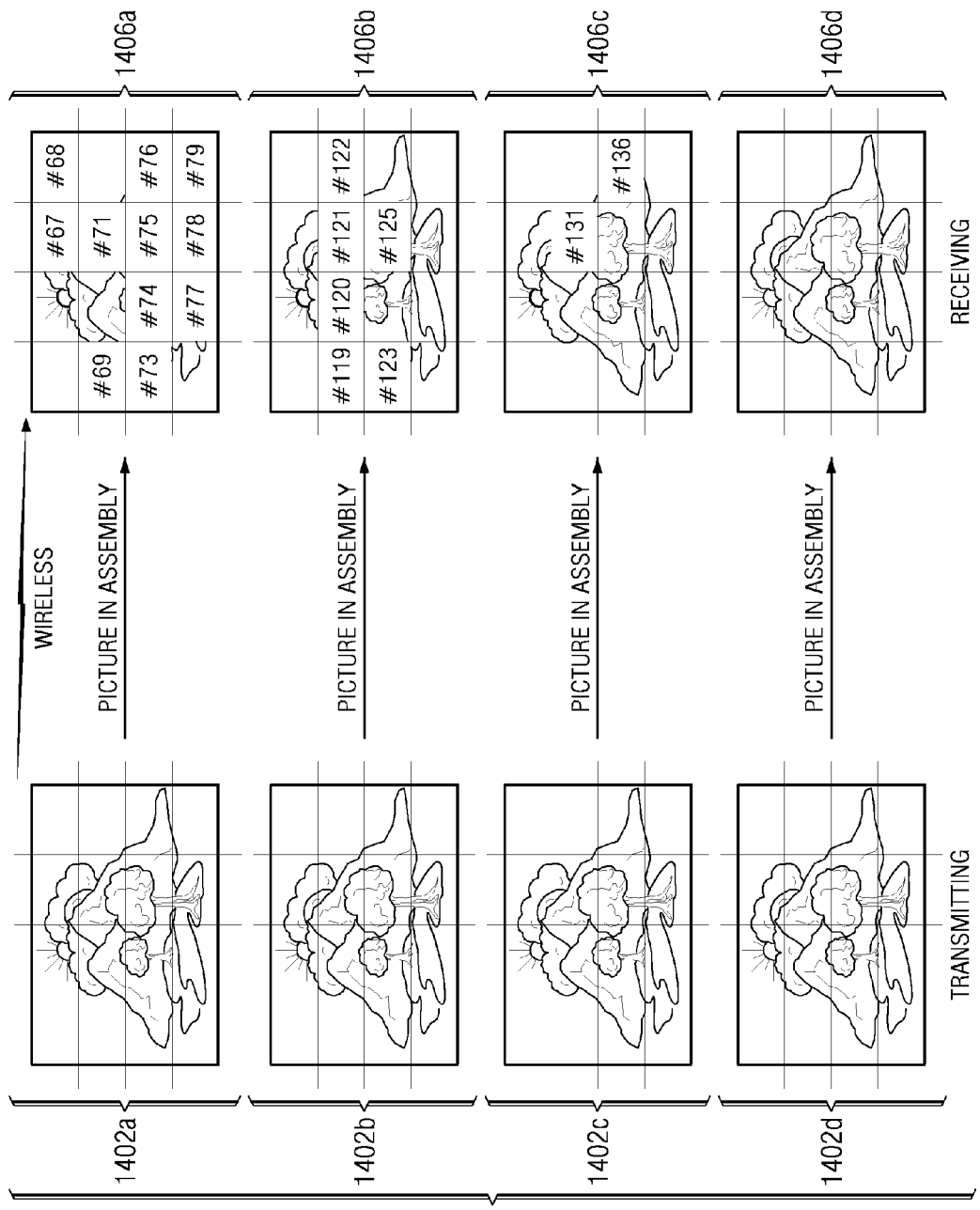
FIG. 14 illustrates the manner in which transmitted video data packets are reassembled at a receiving end.

FIG. 14 provides an example more fully illustrating this concept. The transmitting end includes a picture frame 1402a that is transmitted over a wireless link 1404 to provide a completed picture frame at the receiving end. The first received video frame 1406a is in the process of being assembled. Frame 1406a has received a number of segments of the video frame, but a plurality of video segments, for example, number 67, number 71, number 74, number 79, must still be received from the transmitting end to complete the received frame 1406a. Likewise, transmitted frame 1402b is in the process of being assembled as received frame 1406b and includes a number of segments therein that have not been received. Transmitted frame 1402c has been transmitted and is almost completely assembled as received frame 1406c requiring only two segments, number 131 and number 136 that must be received to complete the frame. Finally, transmitted frame 1402d has been completely received as received frame 1406d and is a completed and processed video image frame.

This process would continue for each frame of the video that is transmitted wherein each frame is assembled using the assembly factory to assemble the sequence of packets numbers into the appropriate received frame 1406. The frames data may then be put together at the received end to provide the received video data. Thus as can be seen, the receiving end receives packet segments in varying orders. In essence, the message factory removes the serial and timing restraints existing in most protocols and allows sporadic, randomly arriving packets and timings to be handled effectively. The receiving end knows which frames (or groups of data) are being built and routes the packet segments to the appropriate assembly template in which the frame is being assembled. An incomplete picture that is lacking packet segments waits in the assembly line area to be completed. Once a frame is completed, the picture is processed. Processed means in whatever manner the data is to be next handled is accomplished. The assembly process continues until the original data requests are completed. Typically this occurs when a user at the terminal end no longer desires to view data and initiates a command to stop the action from the proceeding.

One problem that can develop with this process would be the increasing number of frames (or groups of data) within the assembly area. This occurs when past errors persist that do not allow many frames to be completed without one or more packet retransmissions. To combat this issue, a timer is used to regulate how long an assembly template can remain in assembly. If the assembly template remains for too long it is discarded at step 1116 as described previously. Assembly will then continue on the remaining and forthcoming data templates. The lifespan of the template in the factory is controlled by the message type profile. Time critical data item such as video will have a short life, whereas software update message templates will live much longer since they are not time critical.

Figure 15:
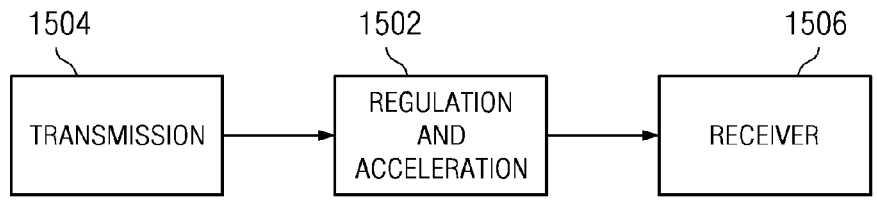
FIG. 15 illustrates the manner in which transmitted data packets may be regulated and/or accelerated in order to achieve better transmission characteristics over a wireless network.

Referring now to FIG. 15, the regulation of the wireless network is an important aspect of allowing the network to pass data and avoid congestion. The rapid messaging protocol utilizes regulation and acceleration processes 1502 between the transmission side 1504 and the receiver side 1506. The integrated two stage network analysis and flow regulator is central to the efficiency gains of the protocol. The two stage analysis and flow regulation limits the packet load within the network at any particular time. By keeping the packet congestion low, failures are reduced and the error correction mechanism is able to replace missing packets in a timely manner. However, if the packet congestion is allowed to increase beyond certain levels, failures increase, and the network bandwidth will not be fully utilized. Therefore, a secondary management system governs the congestion of the network based upon network metrics, performance statistics and settable parameters.

The regulation logic is in the form of rules of known and observed characteristics that assert more intelligence to obtain further gains in network efficiency. The essential components of the network analysis and flow regulation include (1) an integrated primary network analyzer capable of calculating the number of packets in the network at any time; (2) a network statistics manager that detects patterns in: failures, resends, idle states, and other pertinent information about the network; (3) a secondary network analyzer that analyzes network statistics and makes adjustments to the data flow to maximize flow and minimize errors; (4) regulation logic to control the aggressiveness of obtaining higher network speeds or slower more reliable performance; (5) a normalization algorithm to smooth spikes in network performance and allow the regulation logic to converge on an optimum packet flow rate; and (6) scalable time units which allow timings to be expressed in terms of transmit time needed to move a packet from one end to the other.

The primary network analyzer is a mechanism shared between the sending and receiving ends which periodically calculates the number of packets in transit through the network. This is achieved by maintaining a packet counter on the sending end which numbers each packet sent. As these number packets are received at the receiving end, the protocol selectively extracts the count from the receiving packet and reflects it back in the protocol signal packet. When the signal is received at the sending end, the count is extracted and subtracted from the current transmit counter value. The result is the number of packets in the network between the two ends. A normalization algorithm is applied to these measurements to spot trends and smooth spikes in network performance. The regulation logic adjusts the transmission flow from the sending end to keep the number of packets in the network at a target optimum rate.

Figure 16:
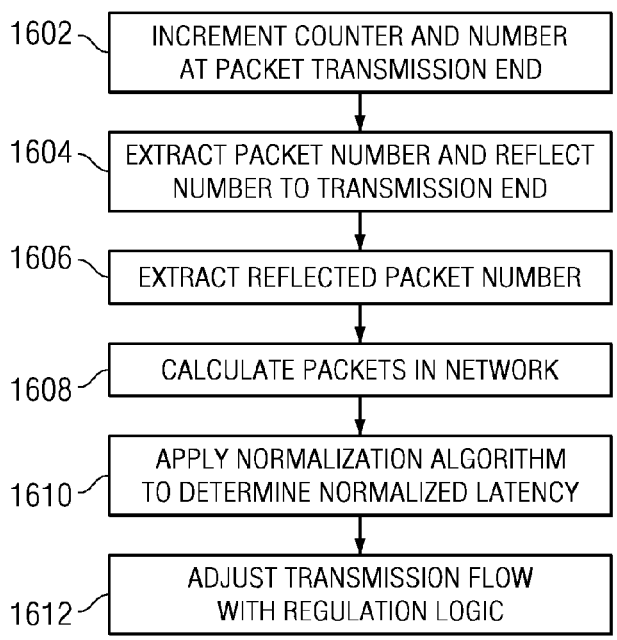
FIG. 16 is a flow diagram illustrating the manner in which the data packets within a wireless network may be processed in order to find the optimum packet load for the network.

The regulation and acceleration process is more fully described with respect FIG. 16. Once a packet has been transmitted from the transmitting end 1504 over the wireless network, a counter is incremented at step 1602 at the packet transmission end. Upon receipt at the receiving end 1506, the packet number inserted within the packet at the packet transmission end is extracted from the packet and reflected back to the transmission end at step 1604. The reflected packet number is received at the transmission end at step 1606, and the delta is taken with the packet counter value. The resulting difference is the number of packets in transit through the network. Based upon the counter tracking the transmitted packets and received reflections at the transmission end, the packets in transit through the network may be determined at step 1608. Using this calculation performed at the transmission end 1504, a normalization algorithm may be applied at step 1610 to determine the normalized packet load of the network. Adjustments of the transmission flow of packet segments within the wireless network may be adjusted at step 1612 utilizing the regulation logic.

The adjustments to the transmission packet flow by the regulation logic at step 1612 are applied to achieve a target network packet load. The adjustments are calculated from a chosen quantity of packets in error referred to as "deviation." For each measurement, the regulation logic quantifies actions taken based on the number of deviation errors existing between the measured latency and the target latency values. For example, if the network target is ten packets, and the measured packets in the network is 19, a chosen deviation size of three packets would yield an error of three deviations (19−10)/3=3. Deviation units vary between negative and positive measured errors. Typically, a lower deviation unit is used for errors that fall below the target, since a low target deviation leaves fewer possible numerical values between zero and the target. These lower deviation values also give the regulation logic a more aggressive characteristic. Metrics and statistical data are also taken into consideration by the regulation logic. For example, if the metrics locate abnormal errors from a level of congestion, the regulation logic may chose to change the linear characteristics of the correction scale by varying the deviation sizes.

Scalable time units allow the protocol timing to be adjusted dynamically in proportion to the speed of the network without losing their intended relation to each other. As the network analyzer probes the network, the round trip timing of a measurement packet is factored into the timings which are expressed in terms of "real time units" or "round trip units" the time it takes to send a packet round trip. This allows the protocol to adjust itself from a wired LAN or to a cellular connection without manual adjustments.

Figure 17:
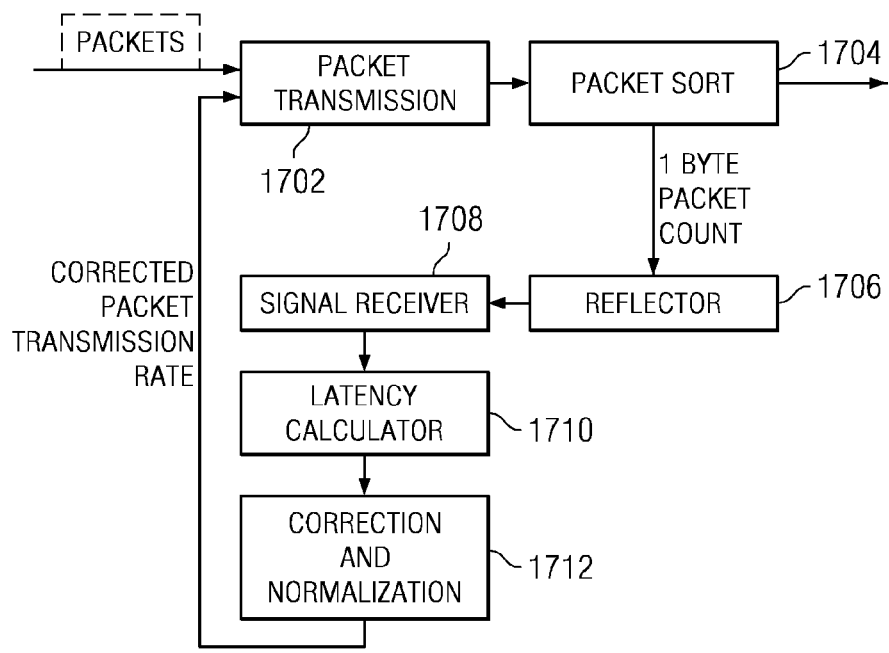
FIG. 17 illustrates the basic network managements of packets within the wireless data transmission system.

Referring now to FIG. 17, there is illustrated the basic network management functionalities of the rapid messaging protocol wireless network data communication system. Packets are provided to the system hardware enabling packet transmission at 1702. Once the packets are received at the receiving end, the packet sort processes 1704 extract the count from the packet header and forward this one byte packet count to the reflector functionalities 1706 for reflecting the count back to the transmission end as a signal packet. After extraction of the count from the packet header at 1704 the packet is sent on for further processing at the receive end. A signal receiver 1708 at the transmission end receives the reflected signal packet from the receiver end and extracts the packet count that is reflected back to the transmission end. Utilizing the extracted count data a network load calculator 1710 differentiates the reflected packet count and the transmitter's current packet counter value. Normalization correction is performed by normalization algorithm 1712 based upon the latency calculations made by the latency calculator 1710. The normalization algorithm 1712 provides a corrected packet transmission rate to the packet transmission circuitry 1702 to optimize network performance.

Figure 18:
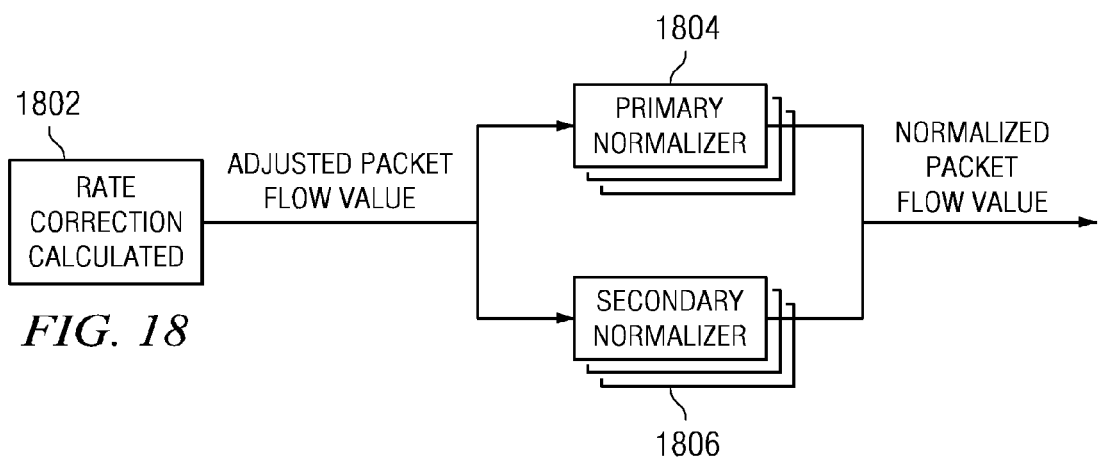
FIG. 18 illustrates the manner in which data packet transmissions may be normalized within the wireless network data transmission system.

Referring now to FIG. 18, there is more fully illustrated details on the operation of the normalization and correction algorithms. The normalization and correction algorithms go into service once a specified number of packets flow through the wireless system have been provided. The normalizers expire once they have been operating for a specified period of time. The adjusted packet flow value is provided to a primary normalizer 1804. The primary normalizer 1804 is initially set from a probed value and begins taking packet flow timing values immediately when the system begins operating. The normalized packet flow values are provided from the primary normalizer 1804. Shorter normalizer life spans increase packet flow responsiveness to changing conditions, but make it less stable. Longer normalizer life spans increase network stability overall, but make the network slower to react to changing network conditions. The normalizers apply a corrective factor to the inner packet delay to bring the measured packet load close to a target value for each deviation away from the target packet load. The corrective timings are normalized to prevent wild swings to either side of the target, enabling a more stabilized behavior to be achieved. The normalization algorithms attempt to find a "sweet spot" which enables the transmissions to maximize network performance while minimizing errors. The normalizers accept many corrected timing values and normalizes them into a stable output value. The normalizers mature when a specified number of timings have been added thereto. Normalizers are active for only a specified number of seconds allowing the protocol to tune the network to changing conditions.

The Normalizer or "Rotating Normalizer" is a mechanism for finding a stable "Sweet spot" of the wireless network. The wireless network is continually changing since a vehicle passes from cell to cell and passes in and out of the range of reception a number of times. The traffic level of each cell also impacts responsiveness. Voice is given top priority, so data takes a back seat. The normalization mechanism composed of a primary normalizer 1804 and a secondary normalizer 1806. As the number of packets in the network are measured, an instantaneous correction is calculated to maintain a desired number of packets in the network. These values are fed into the normalization mechanism and averaged. The primary normalizer 1804 provides a calculated normalized value for as long as it lives. After a specified number of values are added, it reaches the end of its life and is replaced by the secondary normalizer 1806 which begins its life when the primary 1804 is nearing the end of its life. When the secondary normalizer 1806 matures after a specified number of packets, it replaces the primary 1804. The primary 1804 is then discarded. A new secondary normalizer 1806 is created when that primary normalizer 1804 nears the end of its life. The cycle repeats indefinitely. The first primary 1804 is not able to mature before going in service, so it is set to a probed calculation performed when the protocol starts. That value then corrects itself as more network measurement values are added.

The normalizer maintains a steady corrective mechanism which can be adjusted for volatility. The longer a normalizer lives, the steadier it performs, but can become too slow to react. A shorter lived normalizer will change quicker to changing network conditions, but is less stable. This volatility factor may be adjusted by changing the maturity level requirement of the secondary normalizer 1806 before it is allowed to go in service.

Figure 19B:
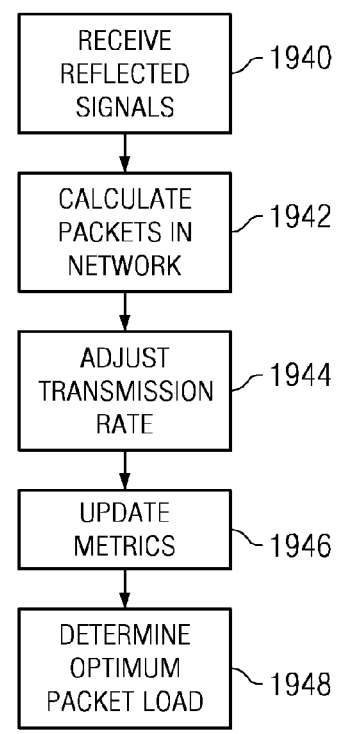
FIG. 19b is a flow diagram illustrating the manner for controlling packet load in the network.
Figure 19A:
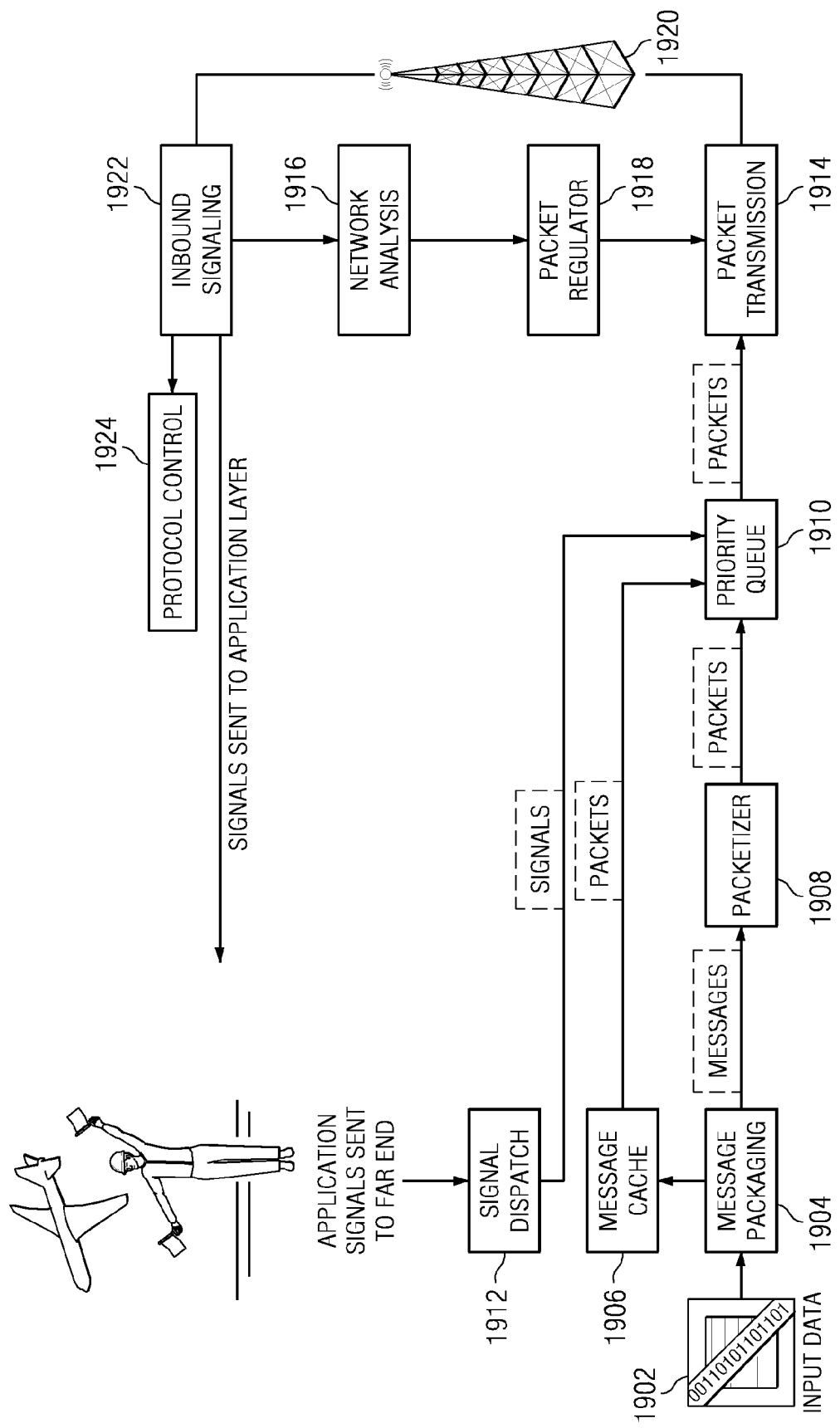
FIG. 19a illustrates the message transmission flow of the wireless data transmission system.

The transmission of data for the rapid messaging protocol wireless data transmission system is illustrated in FIG. 19. The input data 1902 is provided to message packaging functionalities 1904 which packages the provided input data into messages for transmission by the transmission end. A message is simply a piece of raw data submitted to the protocol to be delivered to the receiver end. A message type is a handle the application assigns to a type of data distinguishing it from other types of data. Options are attached to a data type to specialize its handling by the protocol. For example, a picture type may be added to only let pictures arrive in a specific order, and delete pictures arriving late. Time limits may also be attached to types. Messages are verified, and thus guaranteed to arrive uncorrupted. Of course, options within the protocol may alter their treatment.

After the data is packaged into a message for transfer the packaged message is provided to both a message cache 1906 and to a packetizer 1908. The message cache 1906 saves a copy of the message for the time period it is in transit from the transmission end to the receiving end. The message may then be reaccessed as necessary to overcome packet errors. The packetizer 1908 divides the data into data packets for transmission over the wireless network. The packets are provided to a priority queue 1910 which prioritizes signals for transmissions over the wireless network. Signaling packets are transmitted first, resent packets are transmitted second and original message packets are transmitted last according to the queue priority. Signal packets are received from the signal dispatch 1912. Signals are very brief packets sent in both directions between the communicating ends. To minimize overhead, most signals are not tracked by the error corrective mechanism. Most signals simply convey information from the signals type but they may carry data payloads. All signals also carry network analysis information unless they are broadcast signals which are used when the protocol is inactive. Signals are sent to the packet transmitter 1914 with the highest priority of all packets.

The packets are provided according to their queue order to the packet transmission functionalities 1914. Packet transmissions 1914 are controlled responsive to control signals from the network analysis functionalities 1916 and the packet regulation functionalities 1918. The network analysis functionalities 1916 calculate the network load and the packet regulator functionalities 1918 help to maintain the network load. The packets are forwarded to the transmission antenna 1920 for transmission.

The transmission antenna 1920 also receives signals that are provided to the inbound signaling functionalities 1922. The inbound signaling functionalities 1922 provide network load data to the network analysis 1916 such that the regulation and packet flow control may be carried out described as herein. The inbound signaling functionality 1922 provides application signals which are provided to the application signal and message signals which are provided to the priority control functionalities 1924 that handle clean up, cancellation of requests and message control.

Referring now to FIG. 19b, there is more fully illustrated the operation of the transmission portion according to the RMP protocol. Reflected signals are received at step 1940 from the receiver side indicating the counts of packets received at the receiving end. Based upon the information from the received reflected signal, the number of packets in the network may be calculated at step 1942. The transmission system may use the determined number of packets within the network to adjust the transmission rate of the network at step 1944 in order to provide an optimal transmission rate that allows the network to operate most efficiently. The network metrics may be updated at step 1946 based upon the adjusted transmission rate in the presently calculated number of packets within the network and the optimum packet load of the network may be calculated at step 1948 based upon the updated metrics.

Figure 20:
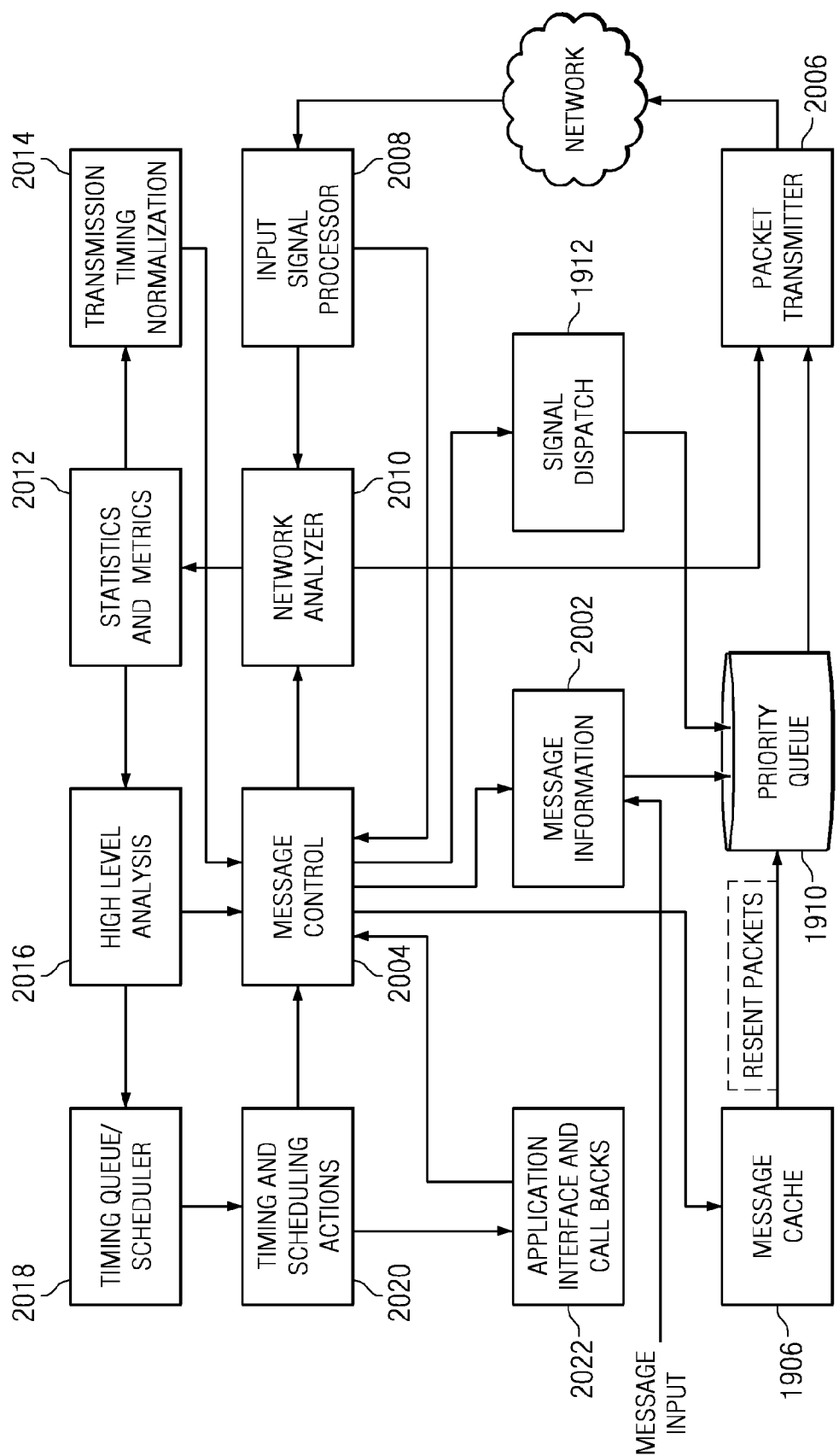
FIG. 20 is a transmission diagram for the rapid messaging protocol.

Referring now to FIG. 20, there is provided more detailed information with respect to the transmission functionalities provided by the transmission end of the rapid messaging protocol wireless data transmission system. Message inputs are provided to the message transmission block 2002. The message transmission block 2002 additionally receives transmission control signals from the message control block 2004. The message transmission block 2002 provides the messages to be transmitted to the priority queue 1910 and controls packet flow. As described previously, the priority queue 1910 establishes the priority order for the transmission of packets from the transmission end. The priority queue 1910 receives control signals from the signal dispatch 1912. The signal dispatch 1912 is also controlled by the message control 2004. Priority queue 1910 also receives packets from the message cache 1906. The priority queue ensures transmission of signals is top priority, followed by resent packets, and then everything else.

The message cache 1906 retransmits packets responsive to messages from message control 2004. The message cache 1906 maintains a copy of a message sent until it is acknowledged by the receiving end. If a message segment resend is requested from the receiving end, a copy of that segment will be retrieved from the message cache 1906 and resent. A future slated guaranteed signal will also be cached in the message cache 1906. When a message is entered into the message cache 1906, a scheduled cleanup event is submitted to the event scheduler 2018 to remove the message after a selected time.

The packet transmitter 2006 transmits the message packets and signal packets over the wireless network. The event scheduler 2018 is a timing queue containing event objects which are associated with particular actions. Events may be marked to repeat any number of times. Often, a condition failed event is scheduled pending a condition success event never arising. Upon success of the event, the event is cancelled. The event scheduler attracts numerous events from the protocol and the application layers simultaneously.

Received signal packets at the transmission end are provided to the input signal processor 2008. The input signal processor extracts data from the received input packets and provides the information to the network analyzer 2010. The input signal processor 2008 provides additional information to the message control 2004. The network analyzer 2010 analyzes the point-to-point packet load over the wireless network and provides this information to the statistics and metrics functionalities 2012. The statistics and metrics functionalities 2012 analyze the packet load information to provide various statistics with respect to packets in the network and provides this information to the transmission timing normalization functions 2014 and the high level analysis functions 2016. The transmission timing normalization functions 2014 normalize the packet load data and provides this information to the message control 2004 to provide for control of various message transmissions within the network.

The high level analysis functionalities 2016 provide information with respect to network operation that is utilized by the timing queue/scheduler 2018 for scheduling packet transmissions within the network. The scheduling information provided by the timing queue/scheduler 2018 is provided to the timing and scheduling actions 2020 which provides output information to the message control 2004 and provides input to the application interface and callbacks 2022. The application interface and callbacks provides data to the message control 2004. The message control 2004 provides settings for deviation and correction factors that are different for measured point-to-point packet loads above and below the target value. This enables the protocol to be set to behave more aggressively to exploit the network, or more conservatively to provide fewer network errors. For a low target, there is little room below the target for deviation factors to multiply, so more aggressive tuning is recommended for lower targets.

Figure 21:
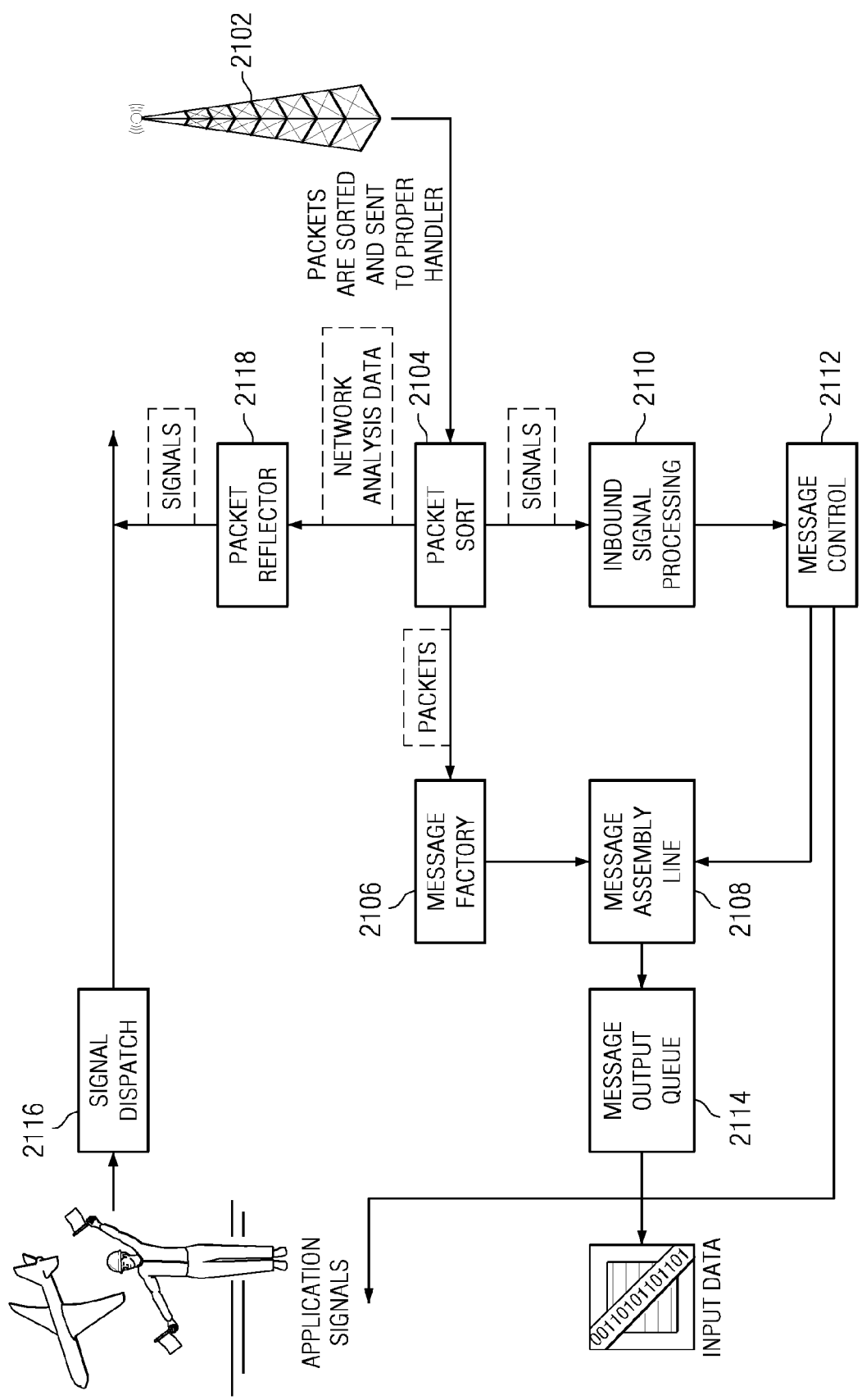
FIG. 21 is a receiver flow diagram of the rapid messaging protocol.

Referring now to FIG. 21, there is provided a top level illustration of the message reception flow within the system. Signals are received at a receiving antenna 2102 from the wireless network. The receive packets are provided to the packet sorter 2104 which sorts the packets and forwards them to the proper handler. Message packets are forwarded to the message factory 2106. The message factory 2106 reads the message headers and creates new message templates using message profiling and sends the packet segments to the message assembly line 2108 for placement in the appropriate template. Message profiling refers to the handling of data on the receiving side. In the example of picture data, if the picture is deemed too old such that it may not fulfill time critical requirements at hand, the old picture, although complete, may be discarded. Message profiling deals with classifying data types so that they can be handled in specific ways. Message profiling in completed data management is dependent on the requirement of the task at hand. Any number of custom requirements can be added to accommodate and product desires and usability.

The packet sorter 2104 sends signal packets to the inbound signal processing block 2110. The inbound signal processing block 2110 processes signal commands sent from the transmission end. The process signals are provided to the message control block 2112 which performs processes such as canceling messages and delivering application signals. The message control 2112 provides control signals to the message assembly line 2108 and provides output application signals.

Within the message assembly line 2108 message segments are placed within their properly assigned message as described hereinabove. Completed messages are output from the message assembly line to the message output queue 2114. The finished messages are made available to the application layer and provided as input data. Input application signals may also be provided to the signal dispatch block 2116 which may be output back to the transmission end via the antenna 2102. The packet sorter 2104 additionally extracts the count information from the received packets and provides this to the packet reflector 2118. The packet reflector 2118 takes the counts within the packet and reflects them back to the transmission end as signals.

Figure 22:
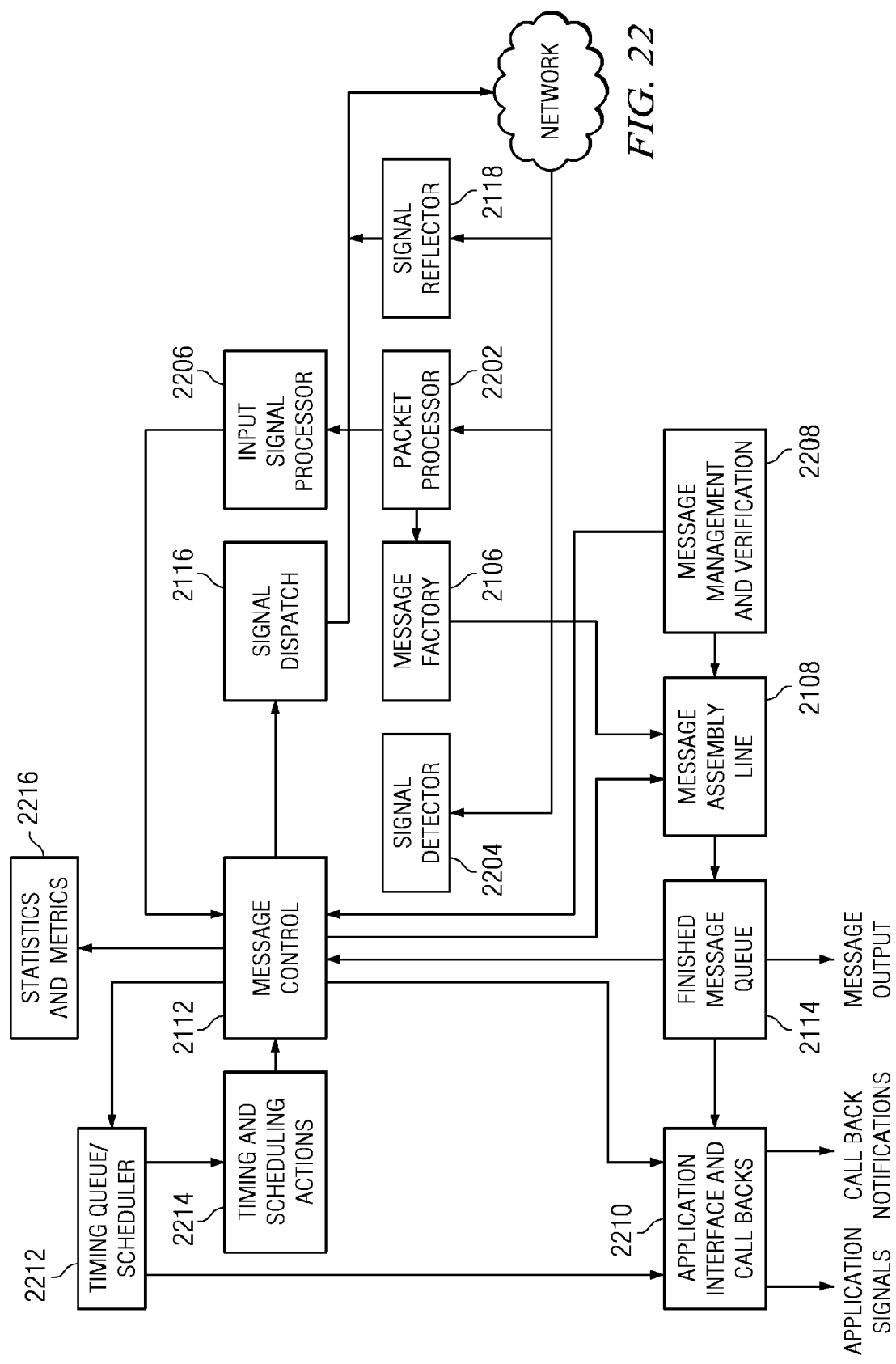
FIG. 22 provides a more detailed illustration of the operation of the receiver side.

Referring now to FIG. 22, there is provided a more detailed illustration of the receiver side of the rapid messaging protocol wireless data transmission system. Packets received from the network are provided to the signal reflector 2118 for reflecting the count back to the transmission end, to the packet processor 2202 for processing received packets and to the signal decoder 2204 for processing signals transmitted to the receiver from the transmitter. Packet processor 2202 provides processed packets to the message factory 2106 for processing as described previously and to the input signal processor 2206. The packet processor 2202 receives the packets from the network and routes them to the proper handling procedures. When the network analysis interval lapses, network analysis information is extracted from the packet and reflected back as a signal. Packet headers are sent to the message factory 2106 where a new message template is created. When the last packet arrives, the verification procedure is called to evaluate all messages within the message assembly line 2108. The message factory 2106 creates a message template object from message header information. If data arrives before the message header, the packet processor may request a generic message template as a temporary holder for the data packets until header information arrives. Each message is assigned a serial number. The templates are loaded with the proper transaction ID and message data.

The input signal processor 2206 provides output signals to the message control 2112. The message factory 2106 provides the appropriate message templates and packets to the message assembly line 2108 which operates in the manner described hereinabove. The message assembly line 2108 also receives message management and verification signals from block 2208 which also provides message management verification signals to the message control 2112. The message assembly line 2108 outputs the assembled messages to the finished message queue 2114 which queues the assembled messages for message output processing and for provision to the application interface and callbacks block 2210. The message assembly line 2108 is a feature of the protocol enabling the process to be less sequence dependent, thereby reducing dependency on timings and order of packet arrival. The message assembly line 2108 can construct many messages at one time such that packets can arrive in any order. When a message is verified or canceled, the entire template is removed from the assembly line 2108.

The application interface and callbacks block 2210 provides output application signals and callback notifications as necessary from the received messages. In addition to receiving input from the finished message queue 2114, the application interface and callbacks block 2210 receives control signals from the message control 2114 and control signals from the timing queue/scheduler 2212. The timing queue/scheduler 2212 queues the output of various signals from the application interface and callbacks block 2210 and additionally provides timing and scheduling information to the timing and scheduling actions block 2214. The application layer interface 2210 is notified by the protocol of events through a series of callbacks. To allow the application layer to more seamlessly interface to the protocol, it is allowed to use the protocol's event management and signaling facilities. Finished messages are queued for transfer to the application layer at its convenience. The timing and scheduling actions block 2214 provides timing information to the message control block 2112. The message control block 2112 also outputs statistics in metrics information 2216 that may be analyzed by the system to improve system performance.

The goal of protocol network management provided by the rapid messaging protocol is to monitor and regulate the packet flow, keeping the packet load of the network to a calculated optimum target level. Basic network management adjusts the network packet flow from the most current packet load calculations. Advance management adjusts the flow based on metrics and statistics. Statistics and metrics provide a level of analysis removed from the mechanics of the protocol. Many trends, problems, performance observations not visible from real time network analysis become clear through the examination of the statistics and metrics. A series of rules takes counter measures on troubling statistical trends. Metrics and statistics provide a window into the health and performance of the protocol. Transmission correction within the network management enables deviation and correction factors to be established for measured network load levels above and below the target value so that the protocol may be set to behave more aggressively to exploit the network, or more conservatively for fewer errors. The corrective algorithm applies a linear reaction against a delta between the measured packet load and the target packet load greater than one deviation. A deviation is a specified number of packets above or below the target value. A corrective factor is applied to the inner packet delay to bring the measured point-to-point network packet load closer to the target. The corrective timings are then normalized to prevent wild swings to either side of the target, therefore a more stable behavior is realized. The correction applied to a deviation is calculated from a chosen quantity of packets and are referred to as a deviation. Statistical data is also taken into consideration by the regulation logic. For example, if the metrics locate abnormal errors from a degraded network connection, the regulation logic may choose to change the linear characteristics of the correction scale by varying the deviation size.

Figure 23:
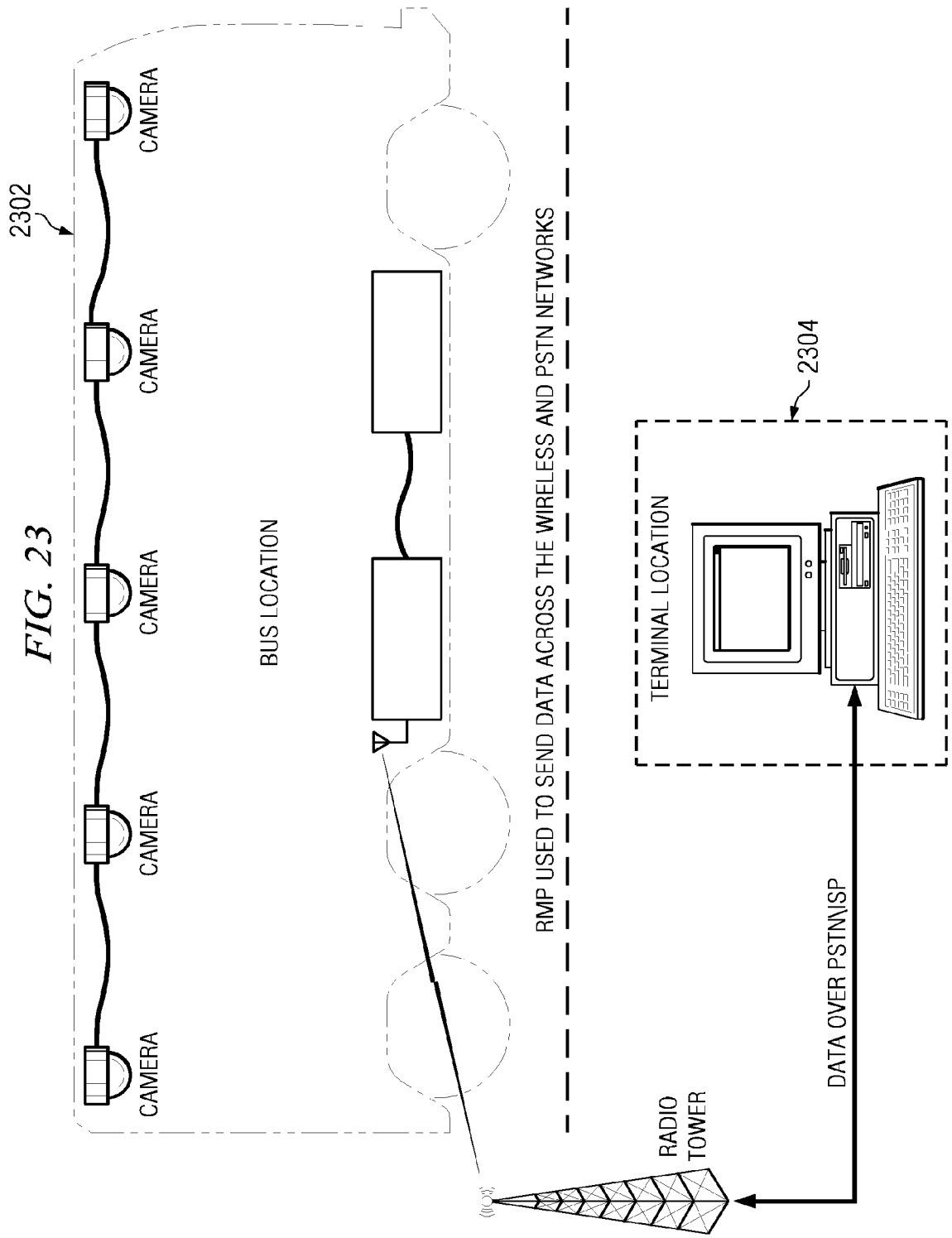
FIG. 23 illustrates a particular use of the rapid messaging protocol wherein video data is transmitted from a bus location to a terminal monitoring location through a wireless communication system.

Referring now to FIG. 23, there is illustrated one example in which the rapid messaging protocol may be utilized to transmit a particular type of data. In this case, picture data taken by cameras on a public transportation conveyance such as a bus 2302 are wirelessly transmitted through a wireless communication system to a monitoring location 2304. The rapid messaging protocol is used to send the video and picture data across the wireless and PSTN networks to the monitoring location 2304. Thus, the picture data from a moving bus can be viewed at a fixed monitoring location 2304. While this example is illustrated with respect to the transmission of picture or video data, the rapid messaging protocol may be utilized to transfer any type of data over a wireless communications link.

It will be appreciated by those skilled in the art having the benefit of this disclosure that this invention provides an improved system and method for transmitting data over a wireless link. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

The invention claimed is:

1. A method for transmitting data over a wireless connection between a transmitter and a receiver, comprising the steps of:
    assigning an assembly template to received data packets belonging to the associated group of data;
    assembling the received data packets within the assembly template into an associated group of data packets in accordance with an assigned sequence values;
    processing the associated group of data when the associated group of data has been completely assembled in the assembly template; and
    maintaining a desired packet load of the wireless connection at a selected level responsive to a packet count maintained at the transmission end.

2. The method of claim 1 further including the step of ensuring reliable transmission of a plurality of data packets using checksum values associated with at least some of the plurality of data packets.

3. The method of claim 2, wherein the step of ensuring further comprises the steps of:
    breaking down the data to be transmitted into a plurality of packets for transmission;
    adding a checksum value to each of the plurality of packets;
    transmitting each of the plurality of packets to a receiving end;
    determining if the checksum value associated with each of the plurality of received packets is valid; and
    requesting retransmission of each packet having a failed checksum value.

4. The method of claim 2, wherein the step of ensuring further comprises the steps of:
    receiving a retransmission request from the receiving end for at least one data packet;
    locating the at least one data packet in a packet queue;
    reassigning a checksum value and a sequence value indicating a location of the at least one data packet in a group of data packets to the at least one packet; and
    retransmitting the at least one packet to the receiving end.

5. The method of claim 1, wherein the step of assembling further comprises the steps of:
    breaking down the data to be transmitted into a plurality of data packets for transmission;
    assigning a sequence value indicating a location of a packet in a group of data packets to each of the plurality of data packets;
    associating a data type with the group of data packets; and
    reassembling the plurality of data packets into an associated group of data packets responsive to the assigned sequence values.

6. The method of claim 5, wherein the step of reassembling further comprises the steps of:
    assigning an assembly template to received data packets belonging to the associated group of data;
    assembling the received data packets within the assembly template in accordance with the assigned sequence values; and
    processing the associated group of data when the associated group of data has been completely assembled in the assembly template.

7. The method of claim 6, further comprising the step of abandoning the assembly template after expiration of a selected period of time.

8. The method of claim 7, further including the steps of:
    determining congestion of the wireless connection responsive to the packet count maintained at the transmission end; and
    adjusting a data packet flow to maintain the packet load of the wireless connection at a desired level.

9. The method of claim 8, further including the step of determining a normalized point-to-point packet load of the network responsive to a number of determined latencies over a first period of time.

10. The method of claim 1, wherein the step of maintaining further comprises the steps of:
    incrementing the packet count maintained at the transmission end responsive to transmission of a data packet having an associated packet identifier;
    extracting the packet identifier from a received data packet at the receiving end;
    reflecting the extracted packet identifier from the receiving end back to the transmission end; and
    decrementing the count maintained at the transmission end responsive to receipt of the reflected extracted packet identifier.

11. A method for transmitting data over a wireless connection between a transmitter and a receiver, comprising the steps of:
    breaking down the data to be transmitted into a plurality of data packets for transmission;
    assigning a sequence value indicating a location of a packet in a group of data packets to each of the plurality of data packets;
    associating a data type with the group of data packets;
    ensuring reliable transmission of a plurality of data packets using checksum values associated with at least some of the plurality of data packets;
    assigning an assembly template to received data packets belonging to the associated group of data
    assembling the received data packets within the assembly template into an associated group of data packets in accordance with the assigned sequence values;
    processing the associated group of data when the associated group of data has been completely assembled in the assembly template;
    determining an optimum packet load of the wireless connection responsive to a packet count maintained at the transmission end; and adjusting a data packet flow to maintain the optimum load packet load of the wireless connection at a desired level.

12. The method of claim 11, wherein the step of ensuring further comprises the steps of:
breaking down the data to be transmitted into a plurality of packets for transmission;
adding a checksum value to each of the plurality of packets;
transmitting each of the plurality of packets to a receiving end;
determining if the checksum value associated with each of the plurality of received packets is valid; and
requesting retransmission of each packet having a failed checksum value.

13. The method of claim 11, wherein the step of ensuring further comprises the steps of:
receiving a retransmission request from the receiving end for at least one data packet;
locating the at least one data packet in a packet queue;
reassigning a checksum value and a sequence value indicating a location of the at least one data packet in a group of data packets to the at least one packet; and
retransmitting the at least one packet to the receiving end.

14. The method of claim 11, and further comprising the step of:
requesting retransmission of a packet if a packet to complete the assembly template has not arrived; and
discarding a retransmitted package if an original missing packed is received.

15. The method of claim 11, further comprising the step of abandoning the assembly template after expiration of a selected period of time.

16. The method of claim 11, wherein the step of determining the optimum packet load further comprises the steps of:
incrementing the packet count maintained at the transmission end responsive to transmission of a data packet having an associated packet identifier;
extracting the packet identifier from a received data packet at the receiving end;
reflecting the extracted packet identifier from the receiving end back to the transmission end; and
decrementing the count maintained at the transmission end responsive to receipt of the reflected extracted packet identifier.

17. The method of claim 16, further including the step of determining a normalized point-to-point packet network packet load of the network responsive to a number of determined packet loads over a first period of time.

18. An apparatus for transmitting data over a wireless connection, comprising:
a transmitter, said transmitter including:
message packaging circuitry for dividing data into a plurality of data packets and assigning sequence numbers to each of the plurality of data packets;
packet regulator circuitry for maintaining a point-to-point packet load of the wireless connection at a selected level responsive to a packet count maintained at the transmitter;
wherein the packet regulator circuitry further comprises a counter for maintaining the packet count at the transmission end responsive to transmission of a data packet having an associated packet identifier and upon receipt of a reflected extracted packet identifier;
wireless transmission circuitry for transmitting the data packets over the wireless connection;
a receiver, said receiver including:
wireless receiver circuitry for receiving the data packets over the wireless connection;
packet processing circuitry for confirming the checksum values of received packets and requesting retransmission of packets containing invalid checksum values; and
message assembly circuitry for assembling received data packets according to an identified predefined template and the sequence numbers assigned at the transmitter.

19. The apparatus of claim 18, wherein the packet processing circuitry further requests retransmission of each packet having a failed checksum value.

20. The apparatus of claim 19, wherein the transmitter further comprises a packet queue for temporarily storing the data packets transmitted on the wireless connection.

21. The apparatus of claim 20, wherein the message packaging circuitry further receives a retransmission request from the receiver for at least one data packet, locates the at least one packet in a packet queue, reassigns the checksum value and the sequence value indicating the location of the at least one data packet in a group of data packets to the at least one packet and retransmits the at least one packet to the receiver.

22. The apparatus of claim 18, wherein message packaging circuitry further associates a data type with the group of data packets.

23. The apparatus of claim 22, wherein the message assembly circuitry further assigns an assembly template to received data packets belonging to the associated group of data and assembles the received data packets within the assembly template in accordance with the assigned sequence values.

24. The apparatus of claim 23, wherein the message assembly circuitry further abandons the assembly template after expiration of a selected period of time.

25. The apparatus of claim 18, wherein the packet processing circuitry further extracts the packet identifier from a received data packet at the receiving end and reflects the extracted packet identifier from the receiver to the transmitter.

26. The apparatus of claim 18, further including packet regulation circuitry for determining the point-to-point packet load of the wireless connection responsive to the packet count maintained at the transmitter and for adjusting a data packet flow to maintain the latency of the wireless connection at a desired level.

27. The apparatus of claim 18, further including normalizer for determining a normalized latency of the network responsive to a number of determined latencies over a first period of time.

28. The apparatus of claim 27, wherein the normalizer further comprises:
a primary normalizer for providing the normalized latency of the network for a first period of time; and
a secondary normalizer for replacing the primary normalizer and providing the normalized point-to-point packet load of the network for a second period of time.

29. A method for transmitting data over a wireless connection, comprising the steps of:
breaking down the data to be transmitted into a plurality of data packets for transmission;
assigning a sequence value indicating a location of a packet in a group of data packets to each of the plurality of data packets;
associating a data type with the group of data packets;
assigning an assembly template to received data packets belonging to the associated group of data;
assembling the received data packets within the assembly template in accordance with the assigned sequence values;

processing the associated group of data when the associated group of data has been completely assembled in the assembly template;

abandoning the assembly template after expiration of a selected period of time; and maintaining a desired packet load of the wireless connection at a selected level responsive to a packet count maintained at the transmission end.

* * * * *